(12) United States Patent
Marriott et al.

(10) Patent No.: US 8,590,507 B2
(45) Date of Patent: Nov. 26, 2013

(54) VARIABLE VALVE ACTUATION CONTROL SYSTEMS AND METHODS

(75) Inventors: Craig D. Marriott, Clawson, MI (US); Matthew A. Wiles, Royal Oak, MI (US)

(73) Assignee: GM Global Technology Operations LLC

( * ) Notice: Subject to any disclaimer, the term of this patent is extended or adjusted under 35 U.S.C. 154(b) by 1092 days.

(21) Appl. No.: 12/570,364

(22) Filed: Sep. 30, 2009

(65) Prior Publication Data

US 2011/0073069 A1    Mar. 31, 2011

(51) Int. Cl.
F02D 13/08    (2006.01)
F02D 13/02    (2006.01)

(52) U.S. Cl.
USPC ..................................... 123/322; 123/406.12

(58) Field of Classification Search
USPC ........ 123/90.15, 406.12, 406.23, 406.25, 322
See application file for complete search history.

(56) References Cited

U.S. PATENT DOCUMENTS

| 4,785,779 | A  | * | 11/1988 | Takao et al. ............... 123/339.22 |
| 4,936,276 | A  | * | 6/1990  | Gopp ....................... 123/406.22 |
| 5,417,186 | A  |   | 5/1995  | Elrod et al. |
| 5,765,527 | A  | * | 6/1998  | Lehner et al. ............. 123/339.1 |
| 6,178,371 | B1 | * | 1/2001  | Light et al. ....................... 701/93 |
| 6,397,800 | B2 |   | 6/2002  | Nohara et al. |
| 6,405,693 | B2 |   | 6/2002  | Yoeda et al. |
| 6,655,329 | B2 |   | 12/2003 | Kammerdiener et al. |
| 6,886,533 | B2 |   | 5/2005  | Leiby et al. |
| 7,017,539 | B2 |   | 3/2006  | Lewis et al. |
| 7,021,277 | B2 |   | 4/2006  | Kuo et al. |
| 7,069,892 | B2 |   | 7/2006  | Lechner et al. |
| 7,079,935 | B2 |   | 7/2006  | Lewis et al. |
| 7,252,061 | B2 |   | 8/2007  | Lucatello |
| 7,278,383 | B2 |   | 10/2007 | Kamiyama et al. |
| 7,280,909 | B2 |   | 10/2007 | Lewis et al. |
| 7,290,527 | B2 | * | 11/2007 | Russell et al. ................ 123/348 |
| 7,299,786 | B2 | * | 11/2007 | Russell et al. ................ 123/322 |
| 7,383,820 | B2 |   | 6/2008  | Lewis et al. |
| 7,950,368 | B2 | * | 5/2011  | Pursifull et al. ......... 123/406.53 |
| 2004/0084022 | A1 | * | 5/2004 | Kinose ..................... 123/406.29 |
| 2005/0183693 | A1 |   | 8/2005 | Yang et al. |
| 2007/0272183 | A1 |   | 11/2007 | Schneider |
| 2008/0135002 | A1 | * | 6/2008 | Yoshiume et al. ......... 123/90.12 |
| 2008/0223338 | A1 | * | 9/2008 | Reed et al. ................ 123/406.12 |
| 2009/0118965 | A1 | * | 5/2009 | Livshiz et al. ................ 701/101 |
| 2011/0197853 | A1 | * | 8/2011 | Takeishi et al. .......... 123/406.45 |

OTHER PUBLICATIONS

U.S. Appl. No. 12/237,471, David J. Cleary, filed Sep. 25, 2008.

* cited by examiner

*Primary Examiner* — Stephen K Cronin
*Assistant Examiner* — Arnold Castro (57) ABSTRACT

A variable valve actuation (VVA) system comprises a spark control module and a phaser control module. The spark control module maintains a spark timing of a cylinder at a maximum braking torque (MBT) spark timing during engine idling. The phaser control module, during the engine idling, adjusts an intake valve timing of the cylinder away from a predetermined intake valve timing. The predetermined intake valve timing corresponds to a maximum air per cylinder (APC) for the cylinder at a current engine speed. The adjustment of the intake valve timing produces an APC that is less than the maximum APC.

20 Claims, 4 Drawing Sheets

VARIABLE VALVE ACTUATION CONTROL SYSTEMS AND METHODS

CROSS-REFERENCE TO RELATED APPLICATIONS

This application is related to U.S. patent application Ser. No. 12/237,471 filed on Sep. 25, 2008. The disclosure of the above application is incorporated herein by reference in its entirety.

FIELD

The present application relates to internal combustion engines and more particularly to variable valve actuation (VVA).

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into gasoline engines is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders. Increasing the amount of air and fuel provided to the cylinders increases the torque output of the engine.

Engine control systems have been developed to control engine torque output to achieve a desired torque. Traditional engine control systems, however, do not control the engine torque output as accurately as desired. Further, traditional engine control systems do not provide a rapid response to control signals or coordinate engine torque control among various devices that affect the engine torque output.

SUMMARY

A variable valve actuation (VVA) system comprises a spark control module and a phaser control module. The spark control module maintains a spark timing of a cylinder at a maximum braking torque (MBT) spark timing during engine idling. The phaser control module, during the engine idling, adjusts an intake valve timing of the cylinder away from a predetermined intake valve timing. The predetermined intake valve timing corresponds to a maximum air per cylinder (APC) for the cylinder at a current engine speed. The adjustment of the intake valve timing produces an APC that is less than the maximum APC.

A method comprises: maintaining a spark timing of a cylinder at a maximum braking torque (MBT) spark timing during engine idling; and, during the engine idling, adjusting an intake valve timing of the cylinder away from a predetermined intake valve timing. The predetermined intake valve timing corresponds to a maximum air per cylinder (APC) for the cylinder at a current engine speed. The adjustment of the intake valve timing produces an APC that is less than the maximum APC.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

An engine control system adjusts various actuator positions to control torque output by an engine. In some circumstances, the engine control system may adjust one or more of the actuator positions to create a reserve torque. For example only, the engine control system may maintain a reserve torque during engine idling.

To reserve torque and apply a reserve torque, engine control systems increase one or more engine airflow parameters and retard spark timing from a maximum braking torque (MBT) spark timing. The reserved torque can be quickly realized by adjusting the spark timing toward the MBT spark timing. For example only, the reserved torque may be used to offset fluctuations in the engine torque output and/or engine speed that may occur during the engine idling. Such fluctuations may otherwise cause the engine to stall. However, the creation of the reserve torque, by sub-optimizing the spark timing, decreases fuel economy as an increased amount of fuel is provided based on the increased airflow parameter(s).

The engine control system of the present disclosure maintains the spark timing at the MBT spark timing during engine idling. The engine control system utilizes variable valve actuation (VVA) technology to adjust an intake valve timing away from a predetermined intake valve timing that creates a maximum amount of air per cylinder (APC). The adjustment of the intake valve timing produces an APC that is less than the maximum APC. For example only, the engine control system may cause an early opening of an intake valve, a late closing of the intake valve, or a transition the opening of the intake valve to a low lift opening. The reduced APC created by the adjustment of the intake valve timing allows a decreased amount of fuel to be provided, thereby decreasing fuel consumption.

Figure 1:
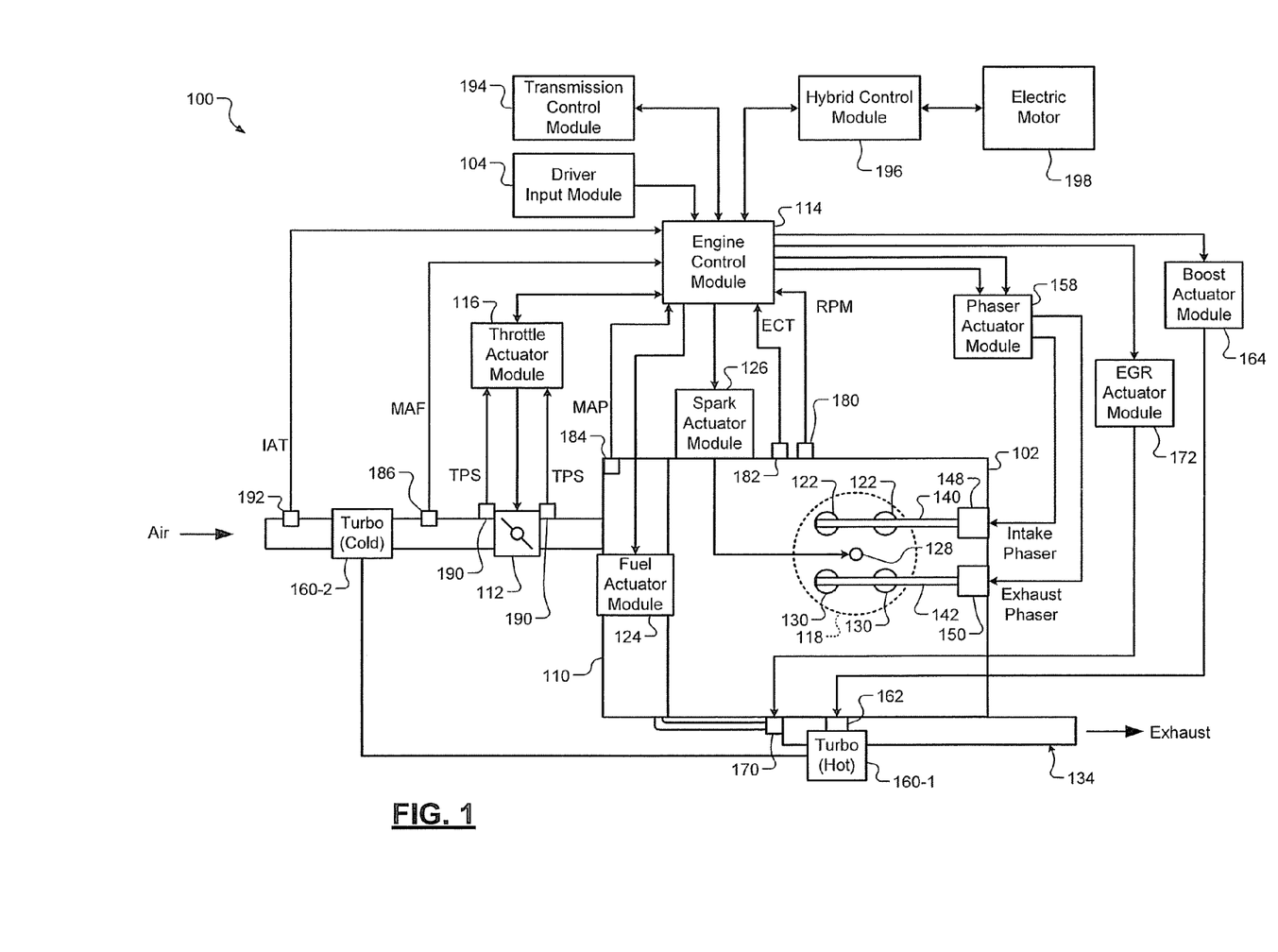
FIG. 1 is a functional block diagram of an exemplary implementation of an engine system according to the principles of the present disclosure.

Referring now to FIG. 1, a functional block diagram of an exemplary engine system 100 is presented. The engine system 100 includes an engine 102 that combusts an air/fuel mixture to produce drive torque for a vehicle based on driver inputs provided by a driver input module 104. Air is drawn into an intake manifold 110 through a throttle valve 112. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. In some circumstances, the ECM 114 may instruct a cylinder actuator module (not shown) to selectively deactivate some of the cylinders. The deactivation of some of the cylinders may improve fuel economy by decreasing fuel consumption.

Air from the intake manifold 110 is drawn into the cylinder 118 via intake valves 122. For example only, one or more intake valves may be provided for each cylinder of the engine 102. The ECM 114 controls a fuel actuator module 124, which regulates fuel injection to achieve a desired air/fuel ratio. Fuel may be injected into the intake manifold 110 at a central location or at multiple locations, such as near the intake valves 122 of each of the cylinders. In various implementations not depicted in FIG. 1, fuel may be injected directly into the cylinders or into mixing chambers associated with the cylinders. The fuel actuator module 124 may halt injection of fuel to cylinders that are deactivated.

The injected fuel mixes with air and creates an air/fuel mixture. A piston (not shown) within the cylinder 118 compresses the air/fuel mixture. Based upon a signal from the ECM 114, a spark actuator module 126 energizes a spark plug 128 in the cylinder 118, and a spark from the spark plug 128 ignites the air/fuel mixture. The timing of the spark may be specified relative to the time when the piston is at its topmost position, which is referred to as a top dead center (TDC) position.

The combustion of the air/fuel mixture drives the piston away from the TDC position, thereby driving a crankshaft (not shown). After reaching a bottommost position, which is referred to as a bottom dead center (BDC) position. The piston begins moving toward the TDC position again and expels the byproducts of combustion through exhaust valves 130. While the two exhaust valve 130 are shown in FIG. 1, one or more exhaust valves may be provided for each of the cylinders. The byproducts of combustion are exhausted from the vehicle via an exhaust system 134.

The spark actuator module 126 may be controlled by a timing signal indicating how far before or after the TDC position the spark should be provided. In other words, operation of the spark actuator module 126 may be synchronized with crankshaft rotation. In various implementations, the spark actuator module 126 may halt provision of spark to deactivated cylinders.

Opening and closing of the intake valves 122 may be controlled by an intake camshaft 140, while opening and closing of the exhaust valves 130 may be controlled by an exhaust camshaft 142. In various implementations, multiple intake camshafts may control multiple intake valves per cylinder and/or may control the intake valves of multiple cylinders. Similarly, multiple exhaust camshafts may control multiple exhaust valves per cylinder and/or may control exhaust valves for multiple banks of cylinders. Opening and closing of the intake and exhaust valves 122 and 130 of deactivated cylinders may be disabled.

The intake camshaft 140 may include a concentric type intake camshaft. More specifically, the intake camshaft 140 may include two independent camshafts oriented concentrically. One of the intake camshafts 140 controls one of the intake valves 122, and the other of the intake camshafts 140 controls the other of the intake valves 122. The intake camshafts may also control respective intake valves of other cylinders.

Opening and closing timing of the intake valves 122 (intake valve timing) may be varied by one or more intake cam phasers, such as intake cam phaser 148. The intake valve timing of one of the intake valves 122 may be controlled independently of the intake valve timing of the other of the intake valves 122. In other words, the intake valve timing of one of the intake valves 122 may be varied independently of the other intake valve timing(s).

In some implementations, the intake valve timing of one of the intake valves 122 may be selectively varied, while the intake valve timing of another of the intake valves 122 may be fixed. For example only, one of the intake camshafts 140 may be phased (advanced or retarded) while the other of the intake camshafts 140 may be fixed to provide a predetermined timing. The predetermined timing may correspond to an intake valve timing to achieve a maximum possible APC at a given engine speed.

When the intake valve timings of each of the intake valves 122 are at the predetermined timing, the cylinder 118 may achieve the maximum possible APC. When one or more of the intake valve timings are adjusted away from the predetermined timing, the cylinder 118 may achieve an APC that is less than the maximum possible APC.

Variable valve actuation (VVA) systems include systems that are capable of adjusting opening and/or closing of an intake valve at a time other than predetermined opening and closing timings of the predetermined timing. Exemplary types of VVA systems may include, for example, early intake valve closure (EIVC) systems, late intake valve closure (LIVC) systems, dual independent cam phasing (DICP) systems, camless VVA systems, and other suitable VVA systems. Other exemplary types of VVA systems may include continuously variable VVA systems and discrete switching VVA systems.

Opening and closing timing of the intake valves 122 (intake valve timing) may be varied by one or more exhaust cam phasers, such as exhaust cam phaser 150. A phaser actuator module 158 controls the intake cam phaser 148 and the exhaust cam phaser 150 based on signals from the ECM 114. When implemented, variable valve lift may also be controlled by the phaser actuator module 158.

The engine system 100 may include a boost device that provides pressurized air to the intake manifold 110. For example, FIG. 1 shows a turbocharger 160 that includes a turbine 160-1 and a compressor 160-2. The turbine 160-1 is powered (i.e., driven) by hot exhaust gases flowing through the exhaust system 134. The compressor 160-2 is driven by the turbine 160-1 and compresses air leading into the throttle valve 112. In various implementations, a supercharger, driven by the crankshaft, may compress air from the throttle valve 112 and deliver the compressed air to the intake manifold 110.

A wastegate 162 may allow exhaust gas to bypass the turbocharger 160 (the turbine 160-1), thereby reducing the boost (the amount of intake air compression) of the turbocharger 160. A boost actuator module 164 controls the boost of the turbocharger 160 based on signals from the ECM 114. The boost actuator module 164 may modulate the boost of the turbocharger 160 by controlling the position of the wastegate 162. In various implementations, multiple turbochargers may be controlled by the boost actuator module 164. The turbocharger 160 may have variable geometry, which may be controlled by the boost actuator module 164.

An intercooler (not shown) may be implemented to dissipate heat from the compressed air charge, which is generated as the air is compressed. The compressed air charge may also absorb heat from the exhaust system 134. Although shown separated for purposes of illustration, the turbine 160-1 and the compressor 160-2 are often close to each other, placing intake air in close proximity to hot exhaust.

The engine system 100 may include an exhaust gas recirculation (EGR) valve 170, which selectively redirects exhaust gas back to the intake manifold 110. The EGR valve 170 may be located upstream of the turbocharger 160. An EGR actuator module 172 controls the EGR valve 170 based on signals from the ECM 114.

Rotational speed of the crankshaft in revolutions per minute (RPM) may be measured using an RPM sensor 180. For example only, pulses may be generated based on the rotation of the crankshaft. Engine speed in RPM may be measured based on the pulses. The temperature of engine coolant may be measured using an engine coolant temperature (ECT) sensor 182. The ECT sensor 182 may be located within the engine 102 or at another suitable location where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 may be measured using a mass air flow (MAF) sensor 186. In various implementations, the MAF sensor 186 may be located within a housing that also includes the throttle valve 112.

The throttle actuator module 116 may monitor the position of the throttle valve 112 using one or more throttle position sensors (TPS) 190. The ambient temperature of air being drawn into the engine 102 may be measured using an intake air temperature (IAT) sensor 192. The ECM 114 may use signals from the sensors and/or other sensors to make control decisions for the engine system 100.

The ECM 114 may communicate with a transmission control module 194 to coordinate shifting gears in a transmission (not shown). For example only, the ECM 114 may reduce the engine torque during a gear shift. The ECM 114 may communicate with a hybrid control module 196 to coordinate operation of the engine 102 and an electric motor 198.

The electric motor 198 may also function as a generator, and may be used to produce electrical energy for use by vehicle electrical systems and/or for storage in a battery. In various implementations, various functions of the ECM 114, the transmission control module 194, and the hybrid control module 196, and/or other modules may be integrated into one or more other modules.

Each system that varies an engine parameter may be referred to as an actuator. Each actuator has an associated actuator value. For example, the throttle actuator module 116 may be referred to as an actuator and the throttle opening area may be referred to as the associated actuator value. In the example of FIG. 1, the throttle actuator module 116 achieves the throttle opening area by adjusting the position of a blade of the throttle valve 112.

Similarly, the spark actuator module 126 may be referred to as an actuator, while the associated actuator value may be the spark timing. Other actuators may include, for example, the boost actuator module 164, the EGR actuator module 172, the phaser actuator module 158, the fuel actuator module 124, and the cylinder actuator module. For these actuators, the associated actuator values may include, for example, boost pressure, EGR valve opening area, intake and exhaust cam phaser angles, fueling mass, and number of cylinders activated, respectively. The ECM 114 may control actuator values in order to achieve a desired engine torque.

The ECM 114 of the present disclosure utilizes the VVA ability to essentially create a reserve torque. The ECM 114 adjusts the intake valve timing of one or more of the intake valves 122 from a predetermined timing during engine idling. The adjustment of the intake valve timing reduces the APC to less than the maximum APC. The adjustment of the intake valve timing away from may be calibrated to create a reserve torque corresponding to a greatest possible torque disturbance. The ECM 114 maintains the spark timing at a predetermined spark timing at which the engine 102 produces a maximum braking torque (MBT) under the current operating conditions. In this manner, the ECM 114 essentially creates a reserve torque.

The intake valve timing of the one of the intake valves 122 can be adjusted toward the predetermined timing within a short period. For example only, the intake valve timing may be selectively adjusted toward the predetermined timing to offset fluctuations in the engine torque and/or the engine speed that may occur during engine idling.

Figure 2:
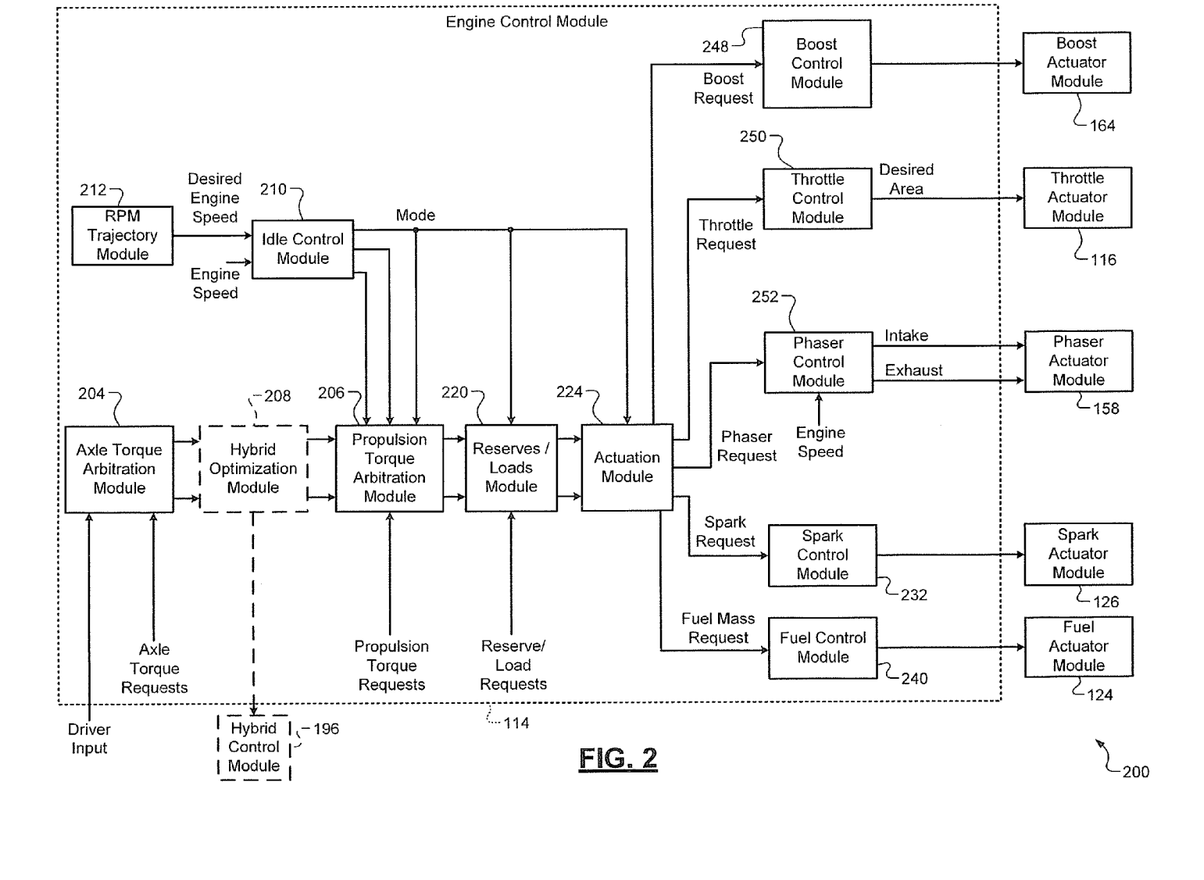
FIG. 2 is a functional block diagram of an exemplary implementation of engine control system according to the principles of the present disclosure.

Referring now to FIG. 2, a functional block diagram of an exemplary engine control system 200 is presented. An exemplary implementation of the ECM 114 includes an axle torque arbitration module 204. The axle torque arbitration module 204 arbitrates between a driver input from the driver input module 104 and other axle torque requests. The driver input may correspond to an amount of torque requested by a driver of the vehicle (i.e., a driver torque request). For example only, the driver input may be based on position of an accelerator pedal. The driver input may also be based on cruise control inputs, which may be an adaptive cruise control system that varies vehicle speed to maintain a predetermined following distance.

Torque requests may include data describing a target torque value as well as a shape for achieving the target torque value. For example only, a torque request may include a ramp, such as a request to ramp the engine torque down to a minimum engine off torque or to ramp the engine torque up from the minimum engine off torque.

Axle torque requests may include a torque reduction requested by a traction control system (not shown) during positive wheel slip. Axle torque requests may also include torque request increases to counteract negative wheel slip, where a tire of the vehicle slips with respect to the road surface because the axle torque is negative. Axle torque requests may also include brake management requests and vehicle over-speed torque requests. Brake management requests may reduce the engine torque to ensure that the engine torque does not exceed the ability of the brakes to hold the vehicle when the vehicle is stopped. Vehicle over-speed torque requests may reduce the engine torque to prevent the vehicle from exceeding a predetermined speed. Axle torque requests may also be made by a chassis/stability control system (not shown).

The axle torque arbitration module 204 outputs a predicted torque request and an immediate torque request based on the results of arbitrating between the received axle torque requests. The predicted torque request is the amount of torque that the ECM 114 prepares the engine 102 to generate, and may often be based on the driver torque request. The immediate torque request is the amount of currently desired engine torque, which may be less than the predicted torque request.

For example, the immediate torque request may be less than the predicted torque request to provide a reserve torque, as described in more detail below, and to meet temporary torque reductions. For example only, temporary torque reductions may be requested when a vehicle speed is approaching an over-speed threshold and/or when the traction control system detects positive wheel slip.

The immediate torque request may be achieved by varying actuators that respond quickly, while slower actuators may be targeted to achieve the predicted torque request. For example, in a gas engine, a change in torque may be accomplished relatively quickly by adjusting the spark timing. In contrast, adjusting throttle opening may take relatively longer to produce the torque change because of mechanical lag time and transport delays associated with drawing air into the engine 102.

Varying the opening of the throttle valve 112 allows for a wide range of engine torque control. However, opening and closing the throttle valve 112 results in a relatively slow change in engine torque. Disabling cylinders also provides for a wide range of engine torque control, but may be similarly slow and additionally involve drivability and emissions concerns. Changing spark timing is relatively fast, but does not provide as much range of engine torque control. In addition, the amount of torque control possible with spark (referred to as spark capacity) changes as the air per cylinder (APC) changes.

The axle torque arbitration module 204 may output the predicted torque request and the immediate torque request to a propulsion torque arbitration module 206. In various implementations, the axle torque arbitration module 204 may output the predicted torque request and the immediate torque request to a hybrid optimization module 208. The hybrid optimization module 208 determines how much torque should be produced by the engine 102 and how much torque should be produced by the electric motor 198. The hybrid optimization module 208 then outputs modified predicted and immediate torque requests to the propulsion torque arbitration module 206.

The predicted and immediate torque requests received by the propulsion torque arbitration module 206 are converted from an axle torque domain (torque at the wheels) into a propulsion torque domain (torque at the crankshaft). This conversion may occur before, after, as part of, or in place of the hybrid optimization module 208.

The propulsion torque arbitration module 206 arbitrates between the converted torque requests and other propulsion torque requests. The propulsion torque arbitration module 206 may generate an arbitrated predicted torque request and an arbitrated immediate torque request. The arbitrated torque requests may be generated by selecting a request from among the received propulsion requests. Alternatively or additionally, the arbitrated torque requests may be generated by modifying one of the received propulsion requests based on another one or more of the received propulsion requests.

The other propulsion torque requests may include torque reductions for engine over-speed protection, torque increases for stall prevention, and torque reductions requested to accommodate gear shifts. The other propulsion torque requests may also result from clutch fuel cutoff, which may be requested to reduce the engine torque when the driver depresses the clutch pedal in a manual transmission vehicle.

The other propulsion torque requests may also include an engine shutoff request, which may be initiated when a critical fault is detected. For example only, critical faults may include detection of vehicle theft, a stuck starter motor, electronic throttle control problems, and unexpected torque increases. For example only, engine shutoff requests may always win arbitration, thereby being output as the arbitrated torques, or may bypass arbitration altogether, simply shutting down the engine 102. The propulsion torque arbitration module 206 may still receive these shutoff requests so that, for example, appropriate data can be fed back to other torque requestors. For example, all other torque requestors may be informed that they have lost arbitration.

An idle control module 210 may also output predicted and immediate torque requests to the propulsion torque arbitration module 206. The torque requests from the idle control module 210 may prevail in the arbitration when an engine idle mode is active. For example only, the engine idle mode may be activated when the driver removes pressure from the accelerator pedal, such as when the vehicle is coasting down from a higher speed. The engine idle mode may alternatively or additionally be activated when the driver torque request is less than a predetermined idle torque, when the predicted torque requested by the axle torque arbitration module 204 is less than the predetermined idle torque, and/or when the engine speed is less than a predetermined speed. The idle control module 210 may output a mode signal that indicates whether the engine idle mode is active or inactive.

The idle control module 210 may also provide the mode signal to the propulsion torque arbitration module 206. The propulsion torque arbitration module 206 may select the predicted and immediate torque requests from the idle control module 210 as the winner of the arbitration when the mode signal indicates that the engine idle mode is active. Otherwise, the propulsion torque arbitration module 206 may select the winner of the arbitration when the engine idle mode is inactive.

The idle control module 210 receives a desired engine speed from an RPM trajectory module 212. For example only, the RPM trajectory module 212 may output a linearly decreasing desired engine speed until the desired engine speed reaches a predetermined idle speed (e.g., approximately 600 RPM). Once the desired engine speed reaches the predetermined idle speed, the RPM trajectory module 212 may continue outputting the predetermined idle speed as the desired engine speed.

The idle control module 210 generates its predicted and immediate torque requests based on the engine speed and the desired engine speed. More specifically, the idle control module 210 may generate its predicted and immediate torque requests to reduce a difference between the desired RPM and the RPM. In other words, the idle control module 210 may generate its predicted and immediate torque requests to maintain the engine speed based on the desired engine speed.

A reserves/loads module 220 receives the arbitrated predicted and immediate torque requests from the propulsion torque arbitration module 206. The reserves/loads module 220 selectively creates a reserve torque in response to various operating conditions. The reserves/loads module 220 may create the reserve torque by increasing the predicted torque request to greater than the immediate torque request.

Slower actuators may be adjusted to achieve the predicted torque request, while faster actuators may be adjusted to produce the immediate torque request. For example only, the opening of the throttle valve 112 may be increased, thereby increasing the MAF and preparing to produce the predicted torque request. The spark timing may be correspondingly reduced (e.g., retarded), thereby reducing the engine torque to the immediate torque request. However, the engine torque may be quickly increased up to approximately the predicted torque request by advancing the spark timing to a maximum braking torque (MBT) spark timing for the current operating conditions.

In sum, the difference between the predicted and immediate torque requests may be called the reserve torque. When a reserve torque is present, the engine torque can be quickly increased from the immediate torque request to the predicted torque request by adjusting an actuator that produces a rapid change in torque. The predicted torque request may thereby be achieved without waiting for a change in engine torque to result from an adjustment of one of the slower actuators.

An actuation module 224 receives the predicted and immediate torque requests from the reserves/loads module 220. The actuation module 224 determines how the predicted and immediate torque requests will be achieved. The actuation module 224 may be engine type specific, with different control schemes for gas engines versus diesel engines. In various implementations, the actuation module 224 may define the boundary between modules prior to the actuation module 224, which may be engine independent, and modules that are engine dependent.

The actuation module 224 may generate actuator specific requests based on the predicted and immediate torque requests. For example only, the actuation module 224 may generate a throttle request, a boost request, and a phaser request. The actuation module 224 may determine desired actuator values for slow actuators based on the predicted torque request.

For example only, the actuation module 224 may determine a desired manifold absolute pressure (MAP), a desired throttle area, and/or a desired air per cylinder (APC). Desired MAP may be used to determine desired boost, and the desired APC may be used to determine desired cam positions. In various implementations, the actuation module 224 may also determine a desired EGR opening for the EGR valve 170. The actuation module 224 may generate the throttle request, the boost request, and the phases request based on the desired MAP, the desired throttle area, and the desired APC, respectively.

The actuation module 224 may provide the boost request, the throttle request, and the phaser request to a boost control module 248, a throttle control module 250, and a phaser control module 252, respectively. The boost control module 248 controls the boost actuator module 164 based on the boost request. The boost actuator module 164 then controls the one or more boost devices of the vehicle. The throttle control module 250 controls the throttle actuator module 116 based on the throttle request. The throttle actuator module 116 then regulates the opening of the throttle valve 112. The phaser control module 252 controls the phaser actuator module 158 based on the phaser request. The phaser actuator module 158 then controls the intake and/or exhaust cam phasers 148 and 150.

In gasoline, or spark ignition combustion engines, the actuation module 224 may also generate a spark torque request and a fuel mass torque request. The actuation module 224 may also generate a cylinder shut-off torque request (not shown). The cylinder shut-off torque request may be used by a cylinder control module (not shown) to determine how many cylinders to deactivate.

The spark torque request may be used by a spark control module 232 to determine a desired spark timing. For example only, the spark control module 232 may determine how much to retard the spark from the MBT spark timing based on the spark torque request. Retarding the spark timing from the MBT spark timing reduces the engine torque below the MBT for the current operating conditions. MBT refers to the maximum engine torque that may be produced for a given APC during optimal combustion of a fuel having at least a predetermined energy content.

The fuel mass torque request may be used by a fuel control module 240 to control the amount of fuel provided to each cylinder. For example only, the fuel control module 240 may determine a fuel mass that, when combined with the current APC, yields stoichiometric combustion. The fuel control module 240 may instruct the fuel actuator module 124 to inject this fuel mass for each activated cylinder.

During normal engine operation, the fuel control module 240 may attempt to maintain a stoichiometric air/fuel ratio. In various implementations, the fuel control module 240 may receive a desired air/fuel ratio request that differs from stoichiometry. The fuel control module 240 may then determine a fuel mass for each cylinder that achieves the desired air/fuel ratio. In diesel systems, the fuel mass may be the primary actuator for controlling the engine torque.

The actuation module 224 of the present disclosure also receives the mode signal and utilizes the VVA ability of the engine system 100 when the engine idle mode is active. When the engine idle mode is active, the actuation module 224 adjusts the phaser request. This adjustment during engine idling causes the phaser control module 252 to adjust the intake valve timing of one or more of the intake valves 122 away from the predetermined timing and the maximum APC. For example only, the phaser control module 252 may cause an early opening of an intake valve, a late closing of the intake valve, or a transition the opening of the intake valve to a lower lift opening. In other words, the phaser control module 252 may adjust intake valve opening timing, intake valve closing timing, or both, away from predetermined intake valve opening and closing timings of the predetermined timing.

The actuation module 224 may determine how much to alter the phaser request based on a predetermined idle reserve torque. For example only, the predetermined idle reserve may include a reserve torque of approximately 15 Nm, approximately 8 Nm, or another suitable reserve torque. The actuation module 224 also maintains the spark request at a spark request corresponding to the MBT spark timing when the engine idle mode is active. The actuation module 224 may also maintain the throttle request based on predetermined idle requests when the engine idle mode is active.

Adjusting the intake valve timing and utilizing the VVA technology instead of retarding the spark timing to create a reserve torque as in traditional engine control systems may increase the vehicle's fuel economy during engine idling. More specifically, the adjustment of the intake valve timing reduces the APC below the maximum APC.

Accordingly, a lesser amount of fuel can be supplied to achieve the desired air/fuel ratio. In this manner, use of the VVA technology may decrease fuel consumption and may increase a mileage per gallon (MPG) rating over traditional spark-based reserve torque systems. The decrease in fuel consumption may vary based on the magnitude of the idle reserve torque. For example only, the decrease in fuel consumption may decrease as the idle reserve torque decreases.

The intake cam phaser 148 may be capable of adjusting an intake camshaft position by at least approximately 100 crankshaft angle degrees (CAD) per second. Therefore, the adjusted intake valve timing may be quickly adjusted back toward the predetermined timing to offset any engine torque and/or engine speed fluctuations that may occur.

Figure 3:
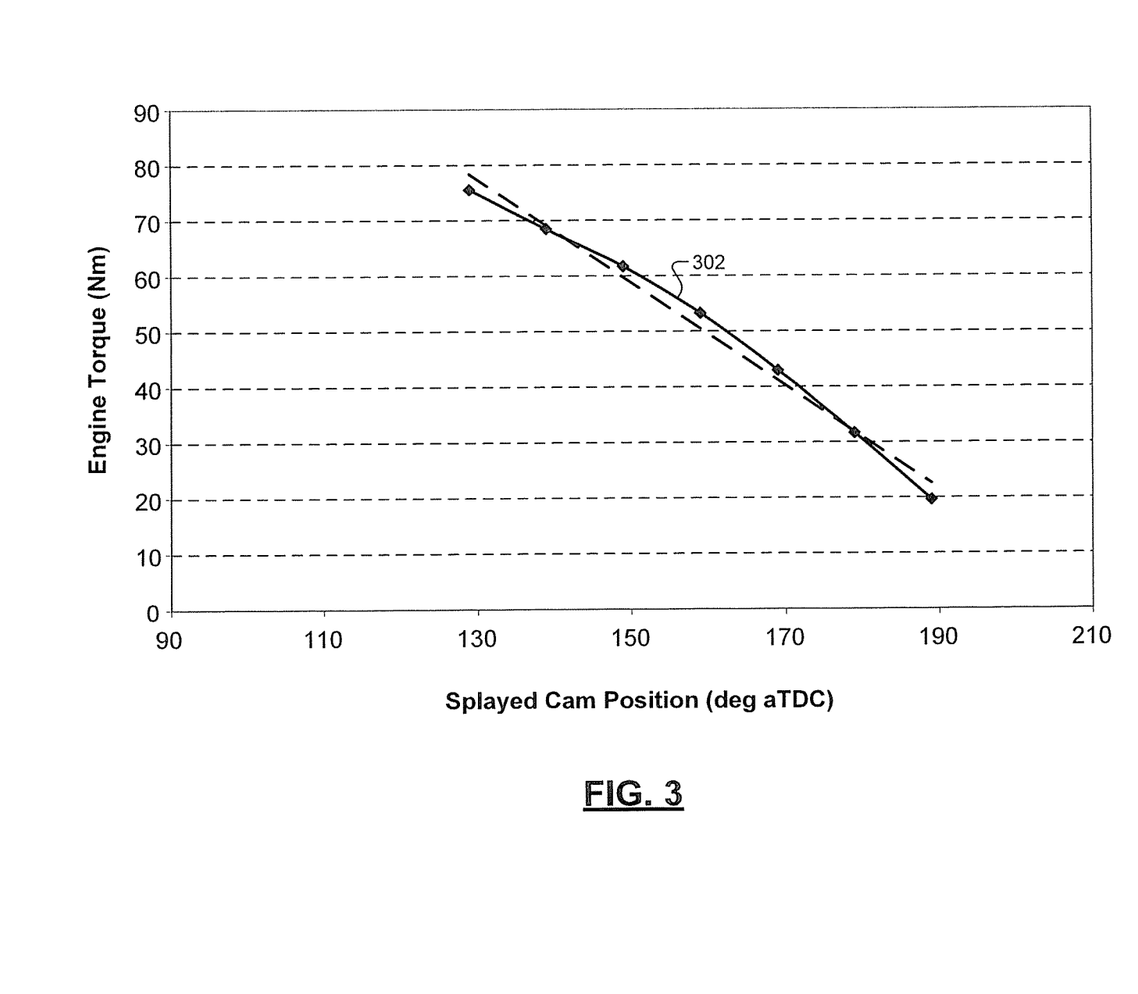
FIG. 3 is an exemplary graph of engine torque versus intake cam splay according to the principles of the present disclosure.

As shown in FIG. 3, the rate of change of torque attainable by adjusting the intake valve timing back toward the predetermined timing may be significant. Accordingly, adjusting the intake valve timing is likely sufficient to meet engine torque and/or engine speed fluctuations that may occur during engine idling, even those of a larger magnitude.

Referring now to FIG. 3, an exemplary graph of engine torque versus intake camshaft splay is presented. Exemplary dashed trace 302 tracks the engine torque produced with the spark timing set to the MBT spark timing at various degrees intake camshaft splay. The degree of splay refers to crankshaft angle degrees (CAD) between the same points (e.g., tips of lobes) on the intake camshafts 140. In other words, splay refers to CAD between when the intake valves 122 both reach a given position. As illustrated by the trace 302, a change in the splay may provide an engine torque change that is likely sufficient to offset engine torque and/or engine speed fluctuations that may occur.

Figure 4:
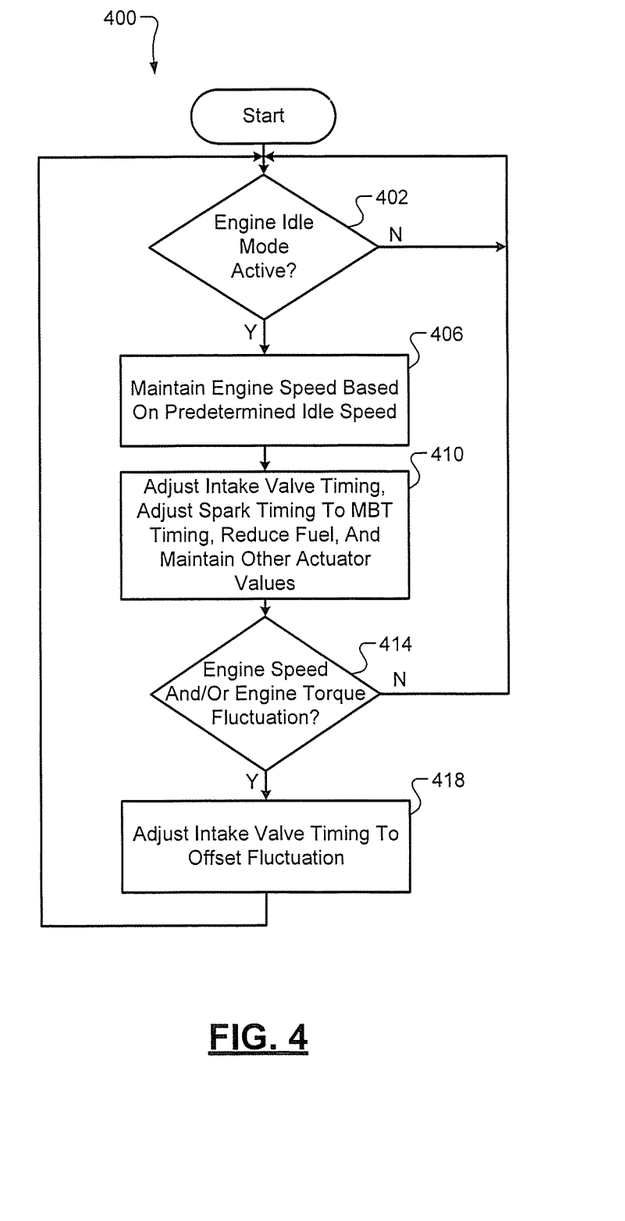
FIG. 4 is a flowchart depicting exemplary steps performed by a method according to the principles of the present disclosure.

Referring now to FIG. 4, a flowchart depicting exemplary steps performed by a method 400 is presented. Control may begin in step 402 where control determines whether the engine idle mode is active. If true, control proceeds to step 406; if false, control remains in step 402. The engine idle mode may be active, for example, when the driver removes pressure from the accelerator pedal, when the driver torque request is less than a predetermined idle torque, when the predicted torque requested by the axle torque arbitration module 204 is less than the predetermined idle torque, when the engine speed is less than a predetermined speed, and/or at another suitable time.

Control maintains the engine speed based on the predetermined idle speed in step 406 and proceeds to step 410. In step 410, control adjusts the intake valve timing away from the predetermined timing corresponding to the maximum APC. Control also adjusts the spark timing to the MBT spark timing in step 410. The adjustment to the intake valve timing may include, for example, a later intake valve closing, an earlier intake valve opening, and/or another suitable adjustment to the intake valve opening that creates an APC that is less than the maximum APC at the predetermined timing. Control may also adjust the fuel mass provided based on the APC created by the adjustment to the intake valve timing and maintain other actuator values, such as the throttle opening in step 410.

In step 414, control determines whether an engine speed and/or engine torque fluctuation has occurred. If true, control adjusts the intake valve timing to offset the fluctuation in step 418, and control returns to step 402. Control adjusts the intake valve timing toward the predetermined timing in step 418 to offset the fluctuation. If false, control returns to step 402. In this manner, control utilizes the VVA ability of the engine system 100 to essentially create a reserve torque during engine idling. The intake valve timing may be rapidly adjusted to offset engine torque and/or engine speed fluctuations that may occur during engine idling.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A variable valve actuation (VVA) system comprising:
   a spark control module that maintains a spark timing of a cylinder at a maximum braking torque (MBT) spark timing during engine idling; and
   a phaser control module that, during the engine idling, adjusts an intake valve timing of the cylinder away from a predetermined intake valve timing,
   wherein the predetermined intake valve timing corresponds to a maximum air per cylinder (APC) for the cylinder at a current engine speed, and
   wherein the adjustment of the intake valve timing produces an APC that is less than the maximum APC.

2. The VVA system of claim 1 wherein the phaser control module opens an intake valve before an opening timing of the predetermined intake valve timing during the engine idling.

3. The VVA system of claim 1 wherein the phaser control module closes an intake valve before a closing time of the predetermined intake valve timing during the engine idling.

4. The VVA system of claim 1 wherein the phaser control module transitions opening of an intake valve to a low lift opening during the engine idling.

5. The VVA system of claim 1 further comprising a fuel control module that provides a first amount of fuel to the cylinder based on the maximum APC when the intake valve timing is the predetermined intake valve timing and that provides a second amount of fuel based on the APC during the engine idling,
   wherein the second amount is less than the first amount.

6. The VVA system of claim 1 further comprising an idle control module that selectively adjusts the intake valve timing back toward the predetermined intake valve timing based on a comparison of the current engine speed and a predetermined idle speed.

7. The VVA system of claim 6 wherein the idle control module selectively adjusts the intake valve timing back toward the predetermined intake valve timing when the current engine speed is less than the predetermined idle speed.

8. The VVA system of claim 6 wherein the idle control module selectively adjusts the intake valve timing back toward the predetermined intake valve timing based on a difference between the current engine speed and the predetermined idle speed.

9. The VVA system of claim 1 further comprising a throttle control module that maintains a throttle opening based on a predetermined idle opening during the engine idling.

10. The VVA system of claim 1 wherein, after the engine idling ends, the spark control module and the phaser control module selectively control the spark timing and the intake valve timing, respectively, based on a driver torque request.

11. A method comprising:
    maintaining a spark timing of a cylinder at a maximum braking torque (MBT) spark timing during engine idling; and,
    during the engine idling, adjusting an intake valve timing of the cylinder away from a predetermined intake valve timing,
    wherein the predetermined intake valve timing corresponds to a maximum air per cylinder (APC) for the cylinder at a current engine speed, and
    wherein the adjustment of the intake valve timing produces an APC that is less than the maximum APC.

12. The method of claim 11 further comprising opening an intake valve before an opening timing of the predetermined intake valve timing during the engine idling.

13. The method of claim 11 further comprising closing an intake valve before a closing time of the predetermined intake valve timing during the engine idling.

14. The method of claim 11 further comprising transitioning opening of an intake valve to a low lift opening during the engine idling.

15. The method of claim 11 further comprising:
providing a first amount of fuel to the cylinder based on the maximum APC when the intake valve timing is the predetermined intake valve timing; and
providing a second amount of fuel based on the APC during the engine idling,
wherein the second amount is less than the first amount.

16. The method of claim 11 further comprising selectively adjusting the intake valve timing back toward the predetermined intake valve timing based on a comparison of the current engine speed and a predetermined idle speed.

17. The method of claim 16 further comprising selectively adjusting the intake valve timing back toward the predetermined intake valve timing when the current engine speed is less than the predetermined idle speed.

18. The method of claim 16 further comprising selectively adjusting the intake valve timing back toward the predetermined intake valve timing based on a difference between the current engine speed and the predetermined idle speed.

19. The method of claim 11 further comprising maintaining a throttle opening based on a predetermined idle opening during the engine idling.

20. The method of claim 11 further comprising, after the engine idling ends, selectively controlling the spark timing and the intake valve timing based on a driver torque request.

* * * * *